UNITED STATES PATENT OFFICE.

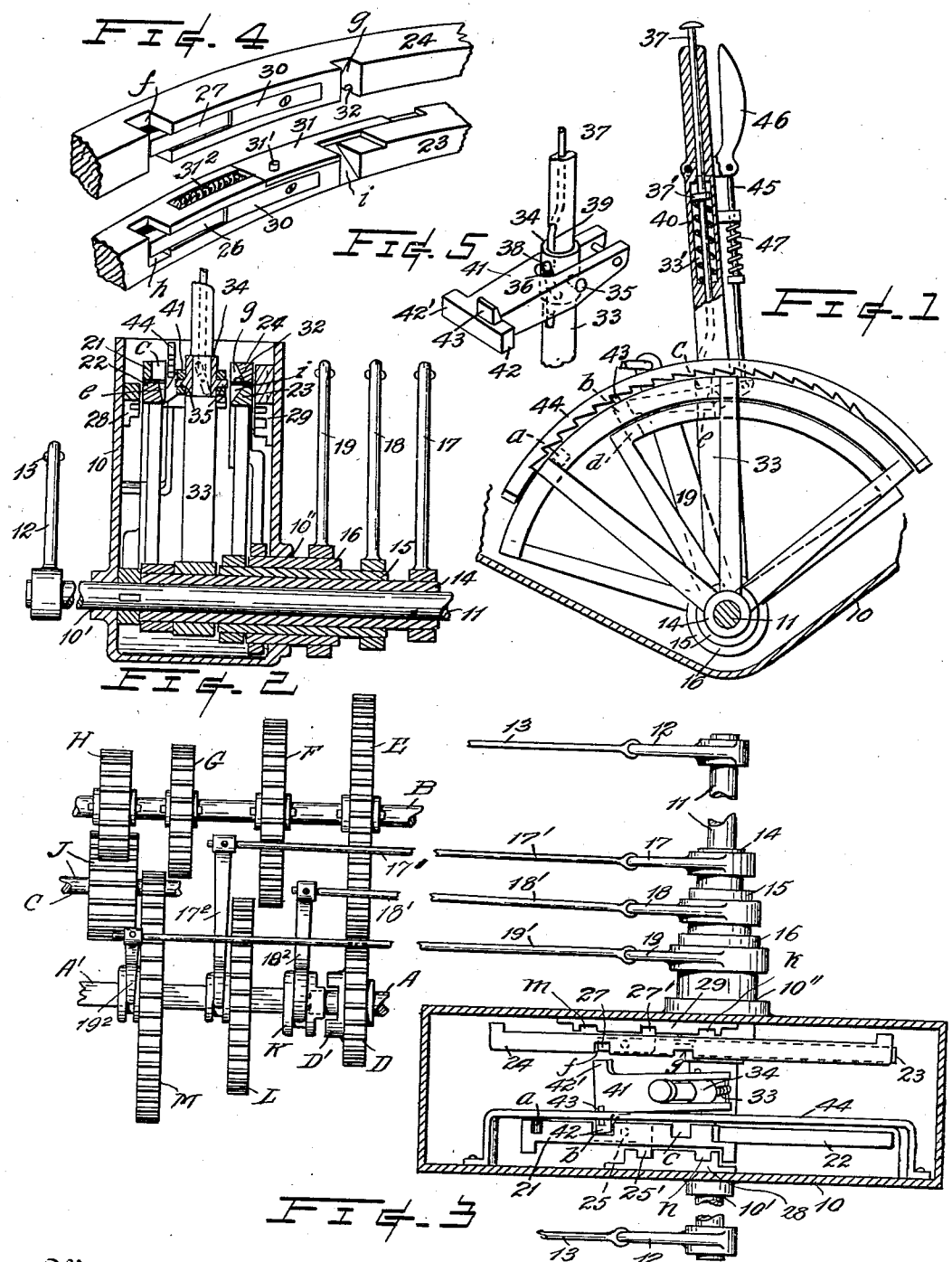

GUY A. BELL, OF SEATTLE, WASHINGTON.

SPEED AND BRAKE CONTROLLER.

No. 862,534.  Specification of Letters Patent.  Patented Aug. 6, 1907.

Application filed February 26, 1906. Serial No. 302,885.

*To all whom it may concern:*

Be it known that I, GUY A. BELL, a citizen of the United States of America, residing at Seattle, in the county of King and State of Washington, have invented certain new and useful Improvements in Speed and Brake Controllers for Motor-Vehicles, of which the following is a specification, reference being had therein to the accompanying drawings, in which—

Figure 1 is an end elevation; Fig. 2, a longitudinal vertical section; and Fig. 3 a plan view of mechanism embodying my invention, and illustrating in Fig. 3 an arrangement of the speed change gearing of an automobile for a clearer understanding of the various controlling parts therefor of the invention. Figs. 4 and 5 are perspective detail views of portions of the invention and which are drawn to a larger scale.

My invention is an improvement in the means for controlling the brake and various driving mechanisms employed on automobiles; and its object is the provision of means for effecting the changes in the speed and the application of the emergency brakes of such a vehicle through the medium of a single lever.

The invention consists in the novel construction, adaptation and combinations of parts as will be hereinafter described and more particularly pointed out in the appended claims.

The change-gear mechanism for which the invention is intended to operate may be of any suitable or ordinary type, such as is illustrated at the left-hand side of Fig. 3. This selected type comprises a two-part power shaft, of which A is directly connected with the motor and the other part A′, from which the vehicle is directly driven, is normally disengaged therefrom; B is the secondary shaft and C is the intermediate shaft.

Fixedly mounted upon the shaft-part A is a pinion D having integral therewith a clutch element D′ and is in continuous mesh with a gear E which is keyed to said secondary shaft as are likewise the gears F, G, H, and the latter is in continuous mesh with the gear J upon said intermediate shaft. Slidably mounted upon the ends of the shaft parts A and A′ and rotatable with the latter is a clutch element K adapted to be shifted lengthwise of the shaft for coupling the parts thereof together and cause them to rotate as a single piece; and gears L and M are slidably mounted upon the shaft part A′, of which the former is adapted to be meshed with the gear F, and the other, M, with either G or J.

The operations of the afore-described parts are obvious and wherewith various changes of speed and a reversal of motion may be imparted to the shaft part A′ and thence transmitted to the automobile driving wheels, as common.

Referring now to the invention, 10 designates a casing which is rigidly secured to the body or other suitable support of an automobile and is provided with oppositely disposed shaft bearings 10′ and 10″.

Extending through the casing and journaled in the bearing 10′ is a shaft 11 having at its ends, desirably, arms 12 which are operatively connected by reach rods 13 with the clutch brakes of ordinary or suitable construction employed upon the rear traction wheels.

Rotatably mounted upon the shaft 11 is a hollow shaft 14 carrying thereon a hollow shaft 15 which, in turn, has mounted thereon the outer hollow shaft 16. These hollow shafts extend from within the casing to outside of the same and are arranged so that the ends of the inner ones project beyond those of the next outer ones as clearly shown in Figs. 2 and 3.

Fixedly secured to each of the respective said hollow shafts are arms 17, 18 and 19 which are connected by rods 17′, 18′ and 19′ to the forked arms $17^2$, $18^2$ and $19^2$ of the several slidable members upon the shaft part A′ of the change gear mechanism above described.

Sector members 21, 22, 23 and 24 are positioned within the casing and respectively secured to the shafts 11, 14, 15 and 16 of which the two first are disposed adjacent to the front end of the casing and the other two to the rear end thereof. The curved portions of 21 and 24 are of the same radius and greater than those of the curved portions of the members 22 and 23 in order that the latter may be arranged to play within the former. The said curved portions are severally provided with series of notches which are disposed upon their inner sides as follows: In member 21, the notches *a*, *b* and *c*, at equal intervals apart; in member 22, see Fig. 1, notches *d* and *e* in the same angular relation with *a* and *b* or *b* and *c*; in member 24, notches *f* and *g* directly opposite *b* and *c* when the various said members are in the relation illustrated in the drawings; and in member 23, notches *h* and *i* in the same axial planes with *f* and *g* when the members are in such assumed position. The notches *g* and *i* are triangular in cross section and have their rear walls reversely inclined as indicated in Figs. 2 and 4; while the notch *e* is also formed with an inclined rear wall and extends in to a lesser distance than do the others, see Fig. 2.

Pivotally mounted in recesses of the curved portions of the members 22, 23 and 24, respectively, are latches 25, 26 and 27 having bent ends such as 25′ and 27′ adapted to be severally engaged in any of the serrations presented of the racks 28 or 29 secured to the casing ends and are resiliently pressed into such engagement by springs, such as 30, provided in the respective said curved portions.

A slidable plate 31 is provided in the outer periphery of the curved portion of the member 23 and has a stud 31′ which protrudes into a circumferential groove 32 within the inner periphery of the member 24 and this groove is of such length that the stud will be engaged by its end to drag the plate, against the opposing force of a connecting spring $31^2$, to cover the top of the notch *i* when the notch *f* has been moved thereabove to form an obturator between the said notches. Loosely fulcrumed upon the shaft 14 is the actuating lever 33 extending up to within convenient reach of the operator. Rotatable upon this lever and in a medial circumferential plane with the curved portions of the said sector members is a sleeve 34 having lateral projecting trunnions 35 and an inclined slot 36. Extending axially through the upper part, and somewhat beyond the top, of the lever is a rod 37 having a bent lower end which terminates in a rectangularly disposed stud 38 extending through a longitudinal slot 39 of the lever and into the said inclined slot of the sleeve and whereby the sleeve is given a partial rotation when movement is imparted to the rod. 40 is a spring within a chamber 33′ of the lever and tending to press the said rod to its uppermost position by bearing against a collar 37′ of the rod.

Fulcrumed upon the sleeve-trunnions 35 is a bifurcated lever 41 having at one end lateral horns 42, 42′ and an upwardly extending lug 43 adapted to engage in the curved ratchet plate 44 which is fixedly secured to the front end of the casing. The other end of this lever 41 is connected by a rod 45 with hand grip lever 46 fulcrumed to lever 33 and normally pressing downwardly by a spring 47 tending to elevate the said lug into engagement with the rack and maintain the horns 42, 42′ in alinement with the curved portions of the members 21 and 24 and the horn 42 is normally held in engagement with a notch of the member 21 by spring 40 acting upon the sleeve 34 through the medium of the connecting rod 37.

The invention is illustrated as being inoperative in respect to the brake and change speed mechanisms, and in which neutral condition the horn 42 of the lever 41 will be engaged with the notch b of the brake controlling sector 21 and which is locked against accidental displacement by the lug 43 being engaged with rack 44. To actuate the low speed, a downward pressure of the operator's thumb upon the top of rod 37 will swerve the lever 41 out of engagement with the sector 21 and cause the horn 42′ of this lever to engage the sector 24 in the notch f and coincidently disconnect the latch 27 from the rack 29, when by a forward movement of the handle lever 33 the last named sector is given a partial rotation to bring the same in position so that the latch will engage with the rack notch k when the notches f and c will be directly opposite, and the gear wheel M shifted into mesh with the gear G. The reverse motion is also accomplished by manipulating the sector 24 by moving the same to bring the latch into position to enter the rack notch m whereupon the gear M is in mesh with the intermediate gear J, and, it will be observed, the horn 42 will be in position to engage in the notch a of sector 21. To get the high speed the sector 24 is first moved into the original position when by a simultaneous pressure of the operator's thumb upon rod 37 and a grip of the hand upon the lever 46, 41 is tilted downwardly and swerved to throw the horn 42′ into h, thereby releasing the latch 26 and permitting the sector 23 being thrust forward to couple the clutch elements K and D′ of the gear mechanism, and in so doing the latch is engaged with the rack notch k and notch h brought opposite the notch c. From this assumed condition midspeed is had by moving the sector 23 back to neutral then releasing the thumb pressure from the top of the rod 37 while still gripping the lever 46 which will allow the horn 42 to enter notch d and, while the sector 22 is thus engaged, moved to present the latch 25 in position to engage with the notch n of the rack 28 and bringing the notch d in line with notch c of sector 21. From this it will be seen that in whatever positions the various said speed change sectors may be placed a notch of the brake sector is presented to receive the horn 42 of the lever 41, and, consequently, the brake can be applied by simply releasing the lever 46 and thrusting 33 forward against the action of the springs ordinarily included in the brake mechanism at the wheels.

When the brakes are applied and it is desired to operate any of the speed mechanisms the lever 33 is released which allows the above-mentioned springs of the brakes to return the lever accompanied by the sector 21 to neutral or the first assumed position, and from there any particular gear may be put into operation, as already explained.

The purpose of sloping the rear faces of the notches g, i and e is to deflect the lever 41, when disengaged from the brake sector 21, into the notch of the sector which has been in operation immediately before should a change of speed be desired therefrom, necessitating the return of the controlling sector to neutral position. For instance, supposing in an emergency that the brakes are to be applied while the vehicle is running under full speed when the sector 23 is in the position which would bring its notch h in line with the notch g and the former opposite the notch e. Now upon releasing the lug 43 from the rack 44 and permitting the lever 33 to be retracted with sector 21 toward the initial position while maintaining pressures upon rod 37 and lever 46, the lever 41 will, when it gets in the same plane with the notches g, i and e be moved into the notch g; for should it first enter i or e the inclined rear walls of which contacting respectively with horns 42′ or 42 would direct its travel thereinto as desired. Should notch f be located in the plane of i and e, the plate 31 intervenes between i and f and the horn 42′ can only enter the latter as the horn 42 cannot descend into the notch e because of its not being sufficiently deep and is movable only into the notch f.

Having now described my invention, what I claim is new and desire to secure by Letters-Patent, is—

1. In a motor vehicle, the combination with the brake controlling sector and the change gear controlling sectors, of a vibratile operating lever, means provided upon the lever whereby the several said sectors may be predeterminately engaged and moved into operative positions and capable of being disengaged from the change gear controlling sectors while in such operative positions and then engaged with the said brake controlling sector.

2. In a motor vehicle, the combination of the brake sector and the change gear sectors severally provided with notches, a vibratile lever, a sleeve mounted upon the said lever and provided with lateral trunnions and diagonally arranged slot, a rod extending axially through said lever and projecting into said slot, another lever fulcrumed upon said trunnions and provided with lateral horns adapted to be engaged in any of the said sector notches, and means carried by the first named lever for tilting the second named one.

3. In a motor vehicle, the combination of the brake sector and the change gear sectors severally provided with notches, a plate slidably mounted in the outer periphery of one of said change gear sectors and engageable with the opposing face of another of such sectors, a vibratile lever, a sleeve mounted upon the said lever and provided with lateral trunnions and a diagonally arranged slot, a rod extending axially through said lever and projecting into said slot, another lever fulcrumed upon said trunnions and provided with lateral horns adapted to be engaged in any of the said sector notches, and means carried by the first named lever for tilting the second named one.

4. In a motor vehicle, the combination of the brake sector and the change gear sectors severally provided with notches, a spring pressed latch for a notch in each of the last named sectors, racks for the said latches, a vibratile lever, a sleeve mounted upon the said lever and provided with lateral trunnions and a diagonally arranged slot, a rod extending axially through said lever and projecting into said slot, another lever fulcrumed upon said trunnions and provided with lateral horns adapted to be engaged in any of the said sector notches, and means carried by the first named lever for tilting the second named one.

5. In a motor vehicle, the combination of the brake sector and the change gear sectors severally provided with notches, a spring pressed latch for a notch in each of the last named sectors, racks for the said latches, a plate slidably mounted in the outer periphery of one of said change gear sectors and engageable with the opposing face of another of such sectors, a vibratile lever, a sleeve mounted upon the said lever and provided with lateral trunnions and a diagonally arranged slot, a rod extending axially through said lever and projecting into said slot, another lever fulcrumed upon said trunnions and provided with lateral horns adapted to be engaged in any of the said sector notches, and means carried by the first named lever for tilting the second named one.

In testimony whereof I affix my signature in presence of two witnesses.

GUY A. BELL.

Witnesses:
PIERRE BARNES,
LOUIS B. MAXSON.